United States Patent
Krishnan et al.

(10) Patent No.: US 6,260,061 B1
(45) Date of Patent: Jul. 10, 2001

(54) TECHNIQUE FOR EFFECTIVELY MANAGING PROXY SERVERS IN INTRANETS

(75) Inventors: P. Krishnan, Matawan; Binay Sugla, Aberdeen, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/977,876

(22) Filed: Nov. 25, 1997

(51) Int. Cl.$^7$ .............................. G06F 13/38; G06F 15/17
(52) U.S. Cl. ............................................. 709/213; 709/218
(58) Field of Search ...................................... 709/213, 233, 709/234, 216, 201, 214, 229, 217, 218, 219; 711/138

(56) References Cited

U.S. PATENT DOCUMENTS

| | | | |
|---|---|---|---|
| 5,708,832 | * 1/1998 | Inniss et al. | 709/229 |
| 5,896,506 | * 4/1999 | Ali et al. | 709/213 |
| 5,913,041 | * 6/1999 | Ramanathan et al. | 709/233 |
| 8,977,876 | 11/1997 | Krishnan et al. . | |

OTHER PUBLICATIONS

Bowman, et al., Harvest: A Scalable, Customizable Discovery and Access System, IEEE, pp. 1–29, Mar. 1995.*
Wang, et al., Prefetching in World Wide Web, IEEE, pp. 28–32 Nov. 1996.*
Cao et al. "Cost–Aware WWW Proxy Caching Algorithms"—Oct. 26, 1997—Internet. http://www.cs.wisc.edu/~cao/papers/gd–size.html.*
Wooster et al. "Proxy Caching That Estimates Page Load Delays" 6th International World Wide Web Conference, Mar. 29, 1997.*
Malpani et al., "Making World Wide Web Caching Servers Cooperate," *World Wide Web Journal*, vol. I, Issue 1, Winter 1996, pp. 107–117.
S. Gadde et al., "Reduce, Reuse, Recycle: An approach to Building Large Internet Caches," Proceedings of the 1997 Conference on Hot Topics in Operating Systems, May 1997, pp. 93–98.
A. Chankhunthod et al., "A Hierarchical Internet Object Cache," Technical Report CU–CS–766–95, Dept of Computer Science, Univ. of Colorado, Boulder, Colorado, Mar. 1994.
R. Kravets et al., "Adaptive Variation of Reliability," Seventh International Conference on High Performance Network, Apr. 28—May 2, 1997, pp. 203–216.

* cited by examiner

*Primary Examiner*—Dung C. Dinh
(74) *Attorney, Agent, or Firm*—Alex L. Yip, Esq.

(57) ABSTRACT

In a communication arrangement including a multiplicity of intranets, objects available on the Internet are requested. A requested object in an intranet is attended by a proxy server therein, which attempts to locate a copy of the requested object in a proxy cache. The latter stores copies of objects previously obtained by web browsers in the intranet, and affords priority to copies of those objects from selected Internet sites. If the proxy server does not manage to locate a copy of the requested object or determines that a located copy is outdated, the proxy server seeks cooperation from other proxy servers to further search for the object. These cooperating proxy servers are dynamically identified by a manager processor in accordance with the invention. In addition, the manager processor prefetches selected objects from the Internet in anticipation of the object request. The manager processor also helps search the prefetched objects for the requested object.

39 Claims, 2 Drawing Sheets

TECHNIQUE FOR EFFECTIVELY MANAGING PROXY SERVERS IN INTRANETS

FIELD OF THE INVENTION

The invention relates to communications systems and methods, and more particularly to systems and methods for managing cache functions of proxy servers in intranets.

BACKGROUND OF THE INVENTION

A communication network, known as an "intranet," typically provides high-speed information communications among a group of user terminals, e.g., those of a single entity, such as a corporation. Such an intranet is often provided with an access connection to the Internet, by which the various terminals attached to the intranet can obtain information from the Internet. Techniques have been developed to efficiently utilize the often high-speed bandwidth of such an access connection.

One such technique involves use of a proxy server in the intranet. In accordance with this technique, user terminals are connected via the intranet to a proxy server through which the Internet is accessed. Among other things, the proxy server includes a proxy cache which contains copies of objects, including web pages, recently accessed by the terminals. By employing a conventional web browser, a user at a terminal on the intranet may request an object available on the Internet.

In a well known manner, a local cache in the user terminal, which contains copies of objects recently accessed by that terminal only, is first searched for the requested object. If the object is not found there, the object request is then forwarded to the proxy server, where the proxy cache is searched for the object in question. Since the proxy cache (a) has a larger capacity than the local cache and (b) is shared by other terminals, the likelihood of locating the requested object, especially a popular object, in the proxy cache is higher. Only when it is determined that the requested object is not within the proxy cache, a condition known as a "cache miss," would the object request be transmitted to the Internet through the Internet access connection to obtain the object. Thus, by employing such a prior art technique, the volume of the access traffic to and from the Internet over the Internet access connection is reduced from what it would have been had each request had to be served from the Internet itself.

Efforts have been made to increase the proxy cache hit rate to more efficiently utilize the Internet access bandwidth. These efforts call for cooperation of proxy servers in different intranets. In one such effort, a requested object for which a cache miss has been determined is searched in one or more proxy caches of other cooperating servers. Such a search may be performed using a multicasting technique described in: Malpani et al., "Making World Wide Web Caching Servers Cooperate," *World Wide Web Journal,* vol. 1, Issue 1, Winter 1996, pp. 107–117. In another approach, a centralized database of the objects existing in the caches of cooperating servers is maintained to facilitate the object search. For details on this approach, one may refer to: S. Gadde et al., "Reduce, Reuse, Recycle: An approach to Building Large Internet Caches," *Proceedings of the* 1997 *Conference on Hot Topics in Operating Systems,* May 1997, pp. 93–98.

SUMMARY OF THE INVENTION

While the prior art cooperation of proxy servers described above is desirable in searching for a requested object, an aspect of its application has been recognized by us to be disadvantageous. In particular, the cooperating proxy servers in prior art are required to run the same specialized software. They also need to be identified at the time of their configuration, despite the fact that it is hard to predict beforehand which proxy servers are particularly helpful in the cooperation, due to the constantly changing nature of their cache contents. Thus, the search by the cooperating proxy servers invariably results in an ineffective utilization of resources.

The invention, however, solves the above-identified problems. In accordance with the invention, each proxy server is connected to another proxy server through an agent, thereby obviating use of any specialized software in the proxy server to cooperate with another proxy server. Among other things, the agent identifies a subset of objects transferred from a selected Internet source during a predetermined time period, and determines rates of transfers of information from the selected source to realize the respective objects in the subset. An inclusion of the selected source in a priority list depends on at least the transfer rates. The priority list is communicated by the agent to the associated proxy server, which gives priority to caching of those objects from the sources in the list. Each agent also communicates to a manager the priority list, which varies with time. In response to such received lists, the manager dynamically identifies the cooperating proxy servers to the associated agents.

In accordance with an aspect of the invention, in anticipation of an object request, the manager prefetches objects from the Internet based on past request patterns to improve the search performance.

DETAILED DESCRIPTION

Figure 1:
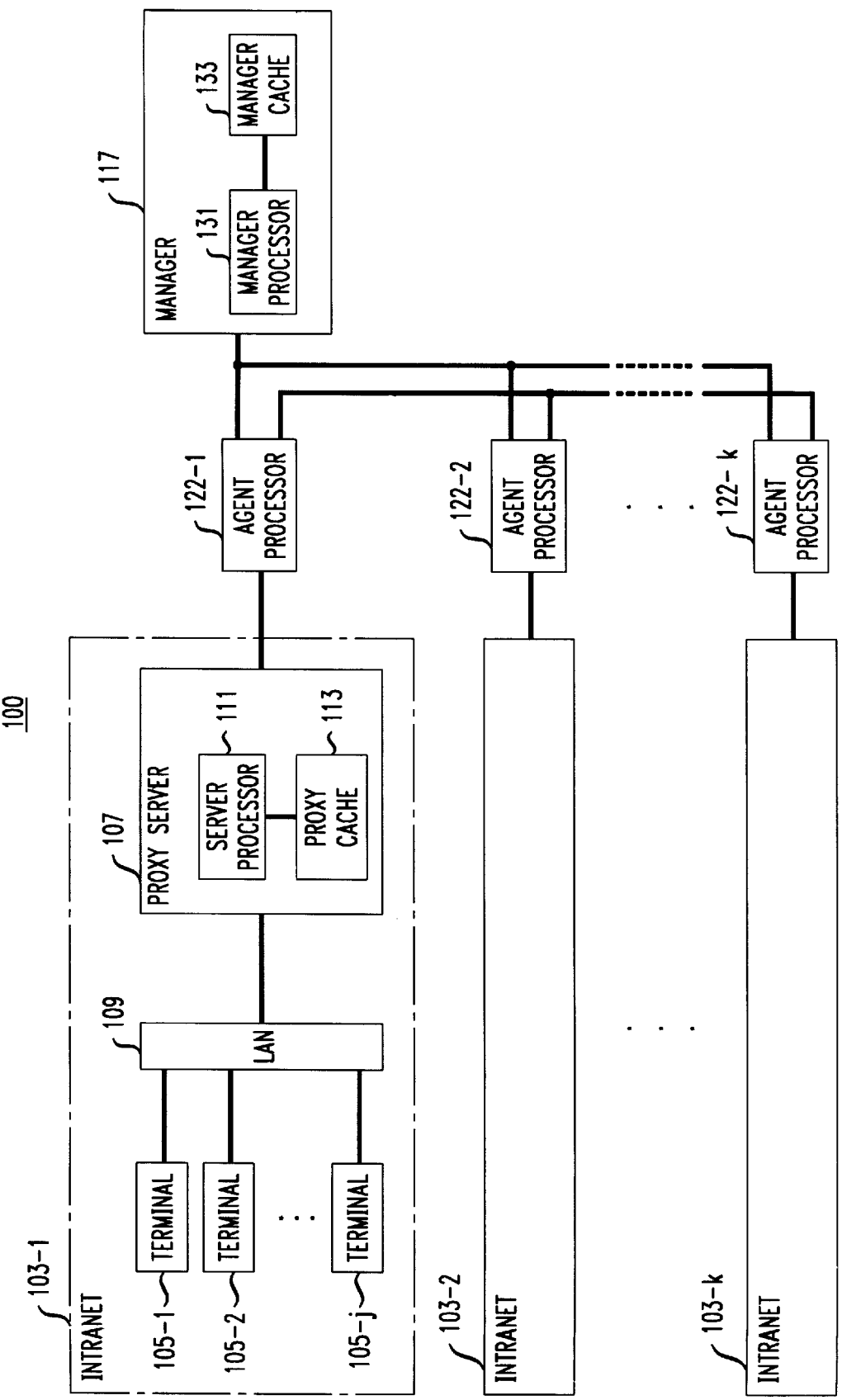
FIG. 1 illustrates a communication arrangement in accordance with the invention.

FIG. 1 illustrates communication arrangement 100 embodying the principles of the invention. Arrangement 100 includes intranets 103-1 through 103-k, here k is an integer greater than 1. In this illustrative embodiment, all the intranets are similarly arranged.

Without loss of generality, in intranet 103-1, terminals 105-1 through 105-j, which may be personal computers (PCs), are connected to proxy server 107 via standard local area network 109, where j is another integer greater than 1. Proxy server 107 of conventional design includes server processor 111 and proxy cache 113. The latter contains copies of objects including web pages recently retrieved by one or more of terminals 105-1 through 105-j from the Internet (not shown). Each terminal is equipped with a standard web browser through which a user may request an object available on the Internet. In a well known manner, the requested object is first searched in a local cache in the user terminal storing copies of the objects recently accessed by that terminal. If the object in question is not found there, the object request is then forwarded to proxy server 107, along with an Internet protocol (IP) address identifying the requesting terminal.

Upon receiving the object request and the IP address, server processor 111 searches proxy cache 113 for the requested object. Since proxy cache 113 has a larger capacity than the local cache and is shared by other terminals, the likelihood of locating the requested object especially a popular object in proxy cache 113 is higher.

If processor 111 locates the requested object in cache 113, it determines whether the object is outdated. Since the object in this instance is a hypertext markup language (HTML) document, it provides for an expiration date of the object in its header. If the current date does not exceed the expiration date, the located object is determined to be fresh. In the event that the creator of the object neglects to provide the expiration date, processor 111 in a conventional manner determines its freshness based on the last revision date in the header, instead. Processor 111 provides a copy of the requested object which is determined to be fresh to the requesting terminal identified by the IP address previously received.

If proxy processor 111 determines that the object in question is not located in cache 113, or that the located object in cache 113 is outdated, the object request is further processed by agent processor 122-1 in a manner described below, without first resorting to the Internet to obtain the object there as in the prior art.

In accordance with the invention, manager 117 is connected to agent processors 122-1 through 122-k. Each agent processor is connected to a respective proxy server in an intranet in the same manner that agent processor 122-1 is connected to proxy server 107. These agent processors are also connected to one another. As described in further detail, each agent processor in arrangement 100 is responsible for, among other things, collecting information from the respective proxy server for manager 117. This information is derived from one or more logs conventionally maintained by the proxy server. For example, one of the logs in the proxy server, herein referred to as the "Access Log," provides a chronological listing of uniform resource locators (URLs) of objects which were obtained by the corresponding terminals or, more specifically, their web browsers identified by IP addresses, along with the volume of data transfer and the time required in obtaining each object from the Internet.

Each agent processor also keeps track of a list of both popular and hard-to-reach sites in the corresponding proxy server, which is fully described below. Manager 117 specifies the criteria for compiling such a list. In addition, each agent processor co-operates with other agent processors based on policies set by manager 117 in accordance with the invention. Each agent processor further keeps track of the number of web browsers served by the corresponding proxy server and identifies the N most active browsers among them, where N=3 in this instance.

The methodology for compiling the aforementioned list of popular and hard-to-reach sites will now be described. To compile such a list, each agent processor, say, agent processor 122-1, first generates two individual lists, namely, a popular site list and a hard-to-reach site list. The criteria for determining whether a site is popular are pre-defined by manager processor 131 in manager 117, and provided to each agent processor. For example, agent processor 122-1 derives, from the URLs of the objects in the above-described access log maintained by server processor 111, the Internet sites from which the objects are obtained. For instance, the site from which an object having a URL "www.netscape.com/index.html" is obtained is indicated in the first part of the URL, namely, "www.netscape.com". Agent processor 122-1 then tallies the number of times each site is accessed over a predetermined time period. In this instance, if the total number of accesses of a site is greater than a predetermined threshold, that site is considered popular. It should be noted that where the length of the predetermined time period used is relatively short, e.g., one day, the popular site may only be topically popular. On the other hand, where the length of the predetermined period used is relatively long, e.g., a few weeks, the popular site would be consistently popular. To keep the size of the collection of popular sites manageable, statistics concerning the sites which are accessed fewer than n times a day may be ignored, where n is a small number, say, 10.

In generating the required popular site list, agent processor 122-1 sorts the popular sites as identified by their numbers of accesses, from the most oft-visited site to the least. Processor 122-1 then assigns a score of 100 to the most oft-visited site having the maximum number of accesses, and a score of 0–100 to each other site, in proportion to its number of accesses relative to the maximum number. The sorted popular sites including the respective scores constitute the popular site list as required.

The difficulty in reaching an Internet site may be attributed to the load currently sustained by the Internet server responsible for the site, bandwidth supported thereby, etc. The criteria for determining whether a site is hard to reach is also pre-defined by manager processor 131, and downloaded to each agent processor. For example, based on the above-described access log maintained in proxy server 111, agent processor 122-1 computes a transfer rate for each requested object, which is a ratio of the amount of the data transferred from a site to realize the object to the time required for the transfer. In this instance, a site is hard to reach if more than a predetermined percentage of the rates of the transfers from that site are smaller than a specified rate. Alternatively, manager processor 131 may promulgate that a predetermined percentage of sites having longest average transfer times are considered to be hard-to-reach sites.

After identifying the hard-to-reach sites, processor 122-1 computes, for each hard-to-reach site, the average of the rates of data transfers from the site. Processor 122-1 then sorts the sites by their respective average transfer rates in reverse order, i.e., from the site commanding the lowest average transfer rate to that commanding the highest. Processor 122-1 assigns a score of 100 to the hardest-to-reach site (L) having the lowest average transfer rate ($m_L$), and a score of 100× ($m_i/m_L$) to each other site (i) whose average transfer rate is $m_i$. The sorted hard-to-reach sites including the respective scores constitute the hard-to-reach site list as required.

Figure 2:
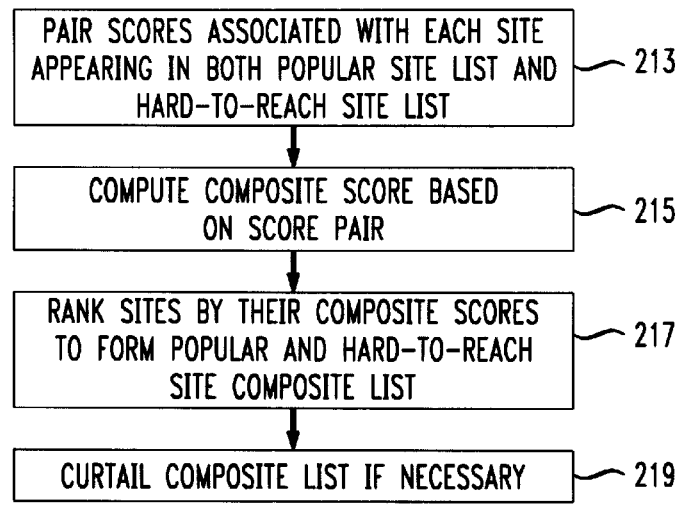
FIG. 2 is a flow chart depicting the steps for compiling an Internet site list used in the arrangement of FIG. 1.

Using the popular site list and the hard-to-reach site list, processor 122-1 generates the popular and hard-to-reach site composite list. To that end, processor 122-1 at step 213 in FIG. 2 pairs the scores associated with each site appearing in both the popular site list and hard-to-reach site list. At step 215, processor 122-1 computes a composite score for such a site based on the corresponding score pair. Specifically, the composite score is a product function of the scores in the pair. For instance, the composite score may simply be a product of such two scores. However, other more sophisticated product functions may also be used, such as the product function described in R. Kravets et al., "Adaptive Variation of Reliability," *Seventh International Conference on High Performance Networks*, April 28–May 2, 1997, pp. 203–216. In any event, processor 122-1 at step 217 ranks the sites by their composite scores, from the highest to the lowest, resulting in the popular and hard-to-reach site composite list, albeit pertinent only to intranet 103-1. If necessary, processor 122-1 at step 219 curtails the composite list to include only a predetermined number of sites from the top of the list.

In accordance with an aspect of the invention, each agent processor, e.g., processor 122-1, provides the corresponding proxy server, e.g., proxy server 107, with its popular and hard-to-reach site composite list. To improve the efficiency in obtaining a requested object, each proxy server stores copies of objects in its proxy cache with priority given to the copies of those objects from the sites in the provided composite list. The copies having priority are stored in a reserved space in the cache until the reserved space runs out. At such time, some of the copies in question would be overwritten by virtue of the relatively low ranking of their originating sites in the composite list.

In addition, each agent processor provides its popular site list, hard-to-reach site list, and the popular and hard-to-reach site composite list to manager processor 131. Based on the received information, manager processor 131 identifies for each proxy server in arrangement 100 other proxy servers cooperating therewith. When the proxy server cannot locate a requested object in its cache, the requested object would then be searched in the caches of the cooperating proxy servers through their agent processors.

Specifically, for each popular site list received by manager processor 131, the latter identifies a predetermined number of hard-to-reach site lists having the most sites matching the sites of the popular site list, especially those high on that list. In accordance with the invention, manager processor 131 also identifies to the particular agent processor originating the popular site list the proxy servers in possession of those hard-to-reach site lists, which are to cooperate with the proxy server associated with the particular agent processor. This stems from an assumption that a requested object which cannot be located by such a proxy server is likely to be from a site in its popular site list. Such a site is likely to be listed in the hard-to-reach site lists of the cooperating proxy servers, which afford high priority in caching copies of those objects from the sites in such lists. As a result, the requested object which is likely from a site in the hard-to-reach site lists is likely to be located in the caches of the cooperating proxy servers.

Thus, manager processor 131 provides to each agent processor the identities of the proxy servers cooperating with the proxy server associated with the agent processor. In addition, manager processor 131 provides to the agent processor some of the popular site lists received by manager 131 which are very different from the popular site list produced by the agent processor, along with the identities of the proxy servers associated with those popular site lists. The agent processor would seek cooperation from these proxy servers to locate the requested object in their caches in the event that the aforementioned assumption is invalid, resulting in an ineffective search by the above-identified cooperating proxy servers.

It should be noted at this point that the popular site, hard-to-reach site and composite lists are updated by agent processors 122-1 through 122-k from time to time to reflect the current object request situations in the respective intranets. In response to such time-variant lists, manager processor 131, for example, dynamically identifies for each proxy server the proxy servers cooperating therewith.

Figure 3:
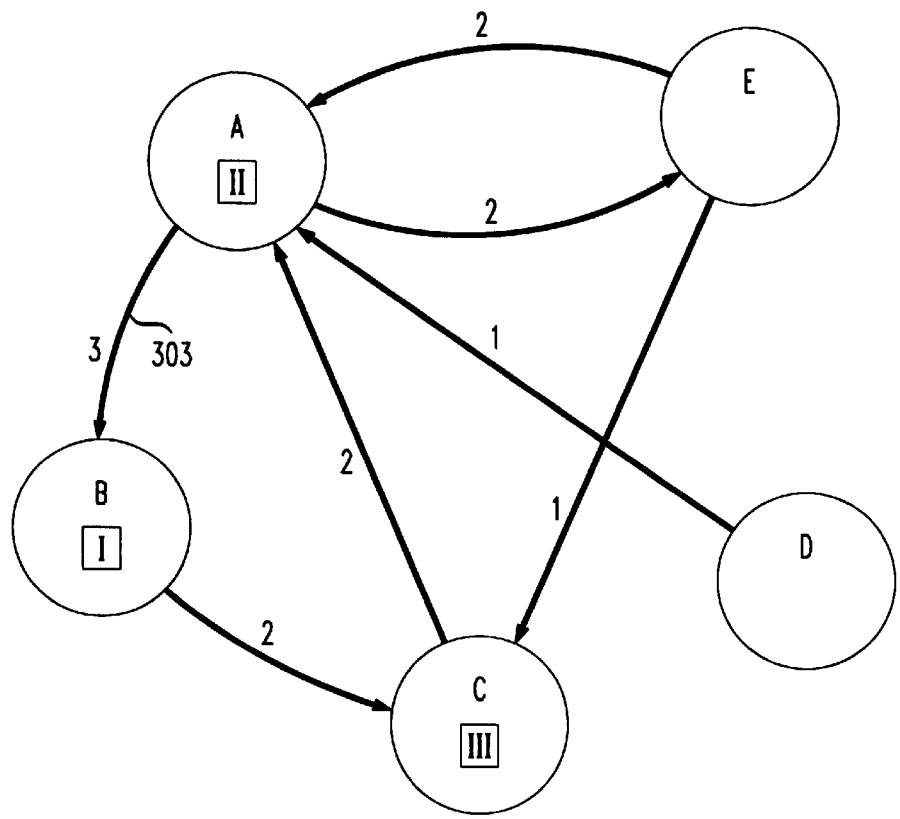
FIG. 3 illustrates a graph tracking objects requested in an intranet in the arrangement of FIG. 1.

To further increase the efficiency in locating requested objects in arrangement 100, selected objects are prefetched by manager processor 131 from the Internet in anticipation of requests for such objects. To select the objects to be prefetched, each agent processor, e.g., agent processor 122-1, needs to create a "URL graph." FIG. 3 illustrates URL graph 300 created by agent processor 122-1 at current time t. The nodes of graph 300, denoted A through E, represent URLs accessed by the N most active web browsers which request the most objects in intranet 103-1 up to t, where N=3 as mentioned before. For example, node A represents $URL_A$ which may be "www.netscape.com/index.html"; node B represents $URL_B$ which may be "www.netscape.com/downloads.html"; node C represents $URL_C$ which may be "www.lucent.com/index.html"; and so on and so forth.

As shown in FIG. 3, each arrow originating from an origination node and pointing to a destination node has a numeral associated therewith, which accounts for the number of times ever that the three most active browsers accessed the URL represented by the destination node after accessing the URL represented by the origination node. Thus, for example, arrow 301 connecting origination node A to destination node B has the numeral "3" associated therewith, indicating that, up to t, there are three occasions in which one of the three most active browsers accessed $URL_A$ after accessing $URL_B$. Such a number of occasions is readily derived from the aforementioned access log.

Also shown in FIG. 3 are tokens I, II and III which are associated with first, second and third ones of the three most active web browsers, respectively. The current placement of tokens I, II and III in nodes B, A and C, respectively, indicates that the first web browser associated with token I has last accessed $URL_B$ represented by node B, that the second web browser associated with token II has last accessed $URL_A$ represented by node A, and that the third web browser associated with token III has last accessed $URL_C$ represented by node C. Assuming that these web browsers would follow the most-frequently traveled route to access the next URL according to graph 300, the first web browser would proceed from node B to node C, i.e., to access $URL_C$ next. As such, $URL_C$ is a good candidate for a prefetched object. Similarly, the second web browser would proceed from node A to node B, i.e., to access $URL_B$ next. As such, $URL_B$ is also a good candidate for a prefetched object. Finally, the third web browser would proceed from node C to node A, i.e., to access $URL_A$ next. As such, $URL_A$ is a good candidate for a prefetched object as well.

After collecting the prefetched object candidates, processor 122-1 checks the collection of candidates against the copies of objects currently stored in proxy cache 113. If copies of any candidates have already been stored in cache 113, prefetching of those candidates is unnecessary and thus they are eliminated from the candidate collection. Processor 122-1 proceeds to compare the resulting candidate collection with the popular and hard-to-reach site composite list described above. In accordance with an aspect of the invention, only those remaining candidates belonging to the sites in the composite list are inducted into a prefetch list. Processor 122-1 then submits the prefetch list to manager processor 131.

It should be noted at this juncture that URL graph 300 varies with time as processor 122-1 periodically updates it with information concerning the latest object requests by the N most active browsers. It should also be noted that the identities of the N most active browsers tracked by processor 122-1 vary with time as well. As a result, the prefetch list generated by processor 122-1 also varies with time.

In addition, although the above prefetching technique focuses on what the requested objects would likely be in the next round, it will be appreciated that a person skilled in the art will utilize URL graph 300 to predict what the requested objects would be in the next few rounds or a particular round after the next round. When the prediction goes beyond the next round, each token in graph 300 has to go through an additional node for each additional round. As a result, there may be more than one equiprobable route for the token to go through the same number of nodes, with each route terminating at a different end-node. Since each end-node represents a candidate for a prefetched object, it can be shown that the collection of the candidates would grow exponentially with the number of additional rounds considered.

In this illustrative embodiment, like agent processor 122-1, each other agent processor compiles its own prefetch list and submits the list to manager processor 131. After receiving the prefetch lists from the respective agent processors, manager processor 131 combines all the objects in the prefetch lists and eliminates any duplicates thereof to form a global prefetch list. If the number of objects in the global prefetch list does not exceed a predetermined limit, manager processor 131 immediately accesses the Internet to obtain each object in the global list. The prefetched objects are then stored in manager cache 133.

Otherwise, if it is determined that the global prefetch list is too lengthy, manager processor 131 compares such a list with a global popular and hard-to-reach site composite list described below. Only those objects in the global prefetch list belonging to the sites in the global composite list are kept. Again, manager processor 131 accesses the internet to obtain the surviving objects in the global prefetch list. The prefetched objects are then stored in manager cache 133.

The methodology for creating the aforementioned global popular and hard-to-reach site composite list will now be described. To create such a list, manager processor 131 combines the popular site lists received from the respective agent processors to form a global popular site list. Sites common in more than one of such lists are consolidated by summing the respective scores. Similarly, manager processor 131 combines the hard-to-reach site lists received from the respective agent processors to form a global hard-to-reach site list. Again, sites common in more than one of such lists are consolidated by summing the respective scores. Treating the global popular site list and the global hard-to-reach site list as their local counterparts, manager processor 131 similarly performs the steps in FIG. 2 to generate the global popular and hard-to-reach site composite list. Alternatively, it may be generated by combining the popular and hard-to-reach site composite lists received from the respective agent processors. Once again, sites common in more than one of such lists are consolidated by summing the respective composite scores. The resulting global list may be curtailed by including only a predetermined number of the topmost sites.

Continuing the above example where a requested object in intranet 103-1 cannot be located in proxy cache 113 or the located object is outdated, agent processor 122-1 multicasts the object request to the cooperating proxy servers identified above through their agent processors, and to manager processor 131. Accordingly, the requested object is searched in the cache of each cooperating proxy server, and manager cache 133 where the prefetched objects are stored. If the requested object is located in such a search, the object is provided to server processor 111 through agent processor 122-1. Again, server processor 111 checks for the freshness of the located object before forwarding the object to the requesting terminal. Only when the server processor 111 determines that the located object is outdated or the search renders no result, would server processor 111 access the Internet to obtain the requested object.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, in the illustrative embodiment, the prefetched objects are stored in manager cache 133. It will be appreciated that such prefetched objects will be downloaded to individual proxy caches to further increase the efficiency of locating a requested object.

In addition, communication arrangement 100 illustratively includes a multiplicity of intranets denoted 103-1 through 103-k. However, it will be appreciated that these individual intranets may be merged into a single intranet, incorporating, for example, agent processors 122-1 through 122-k or their equivalent functionalities.

Moreover, in the illustrative embodiment, each agent processor generates a respective popular site list, hard-to-reach site list, and popular and hard-to-reach site composite list. It will be appreciated that manager processor 131 may help generate one or more of such lists based on data provided by the agent processor especially when the agent processor is overloaded.

Further, it will be appreciated that the functionalities of manager processor 131 will be implemented in a distributed fashion and shared by one or more of the agent processors.

Finally, communication arrangement 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We Claim:

1. Apparatus for providing information objects, the information objects being transferred from a plurality of sources, comprising:
   a processor for identifying a subset of the information objects transferred from a selected source during a predetermined time period, the processor determining rates of transfers of information from the selected source to realize the respective information objects in the subset; and
   a controller for determining whether to store information objects from the selected source based on at least the rates of transfers.

2. The apparatus of claim 1 wherein the sources comprise web sites on an Internet.

3. The apparatus of claim 1 wherein the information objects are identified by uniform resource locators (URLs).

4. The apparatus of claim 1 wherein a determination of whether to store information objects from the selected source is also based on the number of information objects in the subset.

5. The apparatus of claim 1 wherein the processor includes the controller.

6. Software including machine readable instructions stored in a tangible medium for performing a process for providing information objects, the information objects being transferred from a plurality of sources, the process comprising the steps of:
   identifying a subset of the information objects transferred from a selected source during a predetermined time period;

determining rates of transfers of information from the selected source to realize the respective information objects in the subset; and determining whether to store information objects from the selected source based on at least the rates of transfers.

7. Apparatus for providing information objects, the information objects being transferred from a plurality of sources, comprising:

a memory, the plurality of sources being remote relative to the memory;

a processor for identifying at least a selected source from the plurality of sources, the processor identifying the selected source based on rates of transfers of information from the selected source to realize information objects from the selected source, the rates of transfers of information being lower than rates of transfers of information from at least one source different from the selected source; and a controller for storing selected information objects from the selected source in the memory.

8. The apparatus of claim 7 wherein the processor also identifies at least a second source from the plurality of sources, the processor identifying the second source based on number of information objects transferred from the second source, the number of information objects transferred being greater than number of information objects transferred from at least one source different from the second source, the information objects transferred from the second source being stored.

9. The apparatus of claim 8 wherein the selected source is the same as the second source.

10. Apparatus for providing information objects to a plurality of requesters requesting the information objects comprising:

a processor for identifying a first information object last requested by a requestor of the plurality of requestors;

a prediction mechanism for predicting a request for a second information object based on a history of one or more of the plurality of requesters requesting the second information object after the first information object, the one or more of the plurality of requesters being selected based on respective numbers of requests made thereby relative to respective numbers of requests made by requesters other than the one or more of the plurality of requesters over a predetermined time period; and an interface for prefetching the second information object in response to the predicted request.

11. The apparatus of claim 10 wherein the processor includes a manager processor.

12. The apparatus of claim 10 wherein the interface includes an agent processor.

13. The apparatus of claim 10 wherein the information objects are identified by URLs.

14. The apparatus of claim 13 wherein the prediction mechanism includes use of a URL graph.

15. The apparatus of claim 10 wherein the plurality of requestors include web browsers.

16. The apparatus of claim 10 wherein the history includes a count of incidents in which any one of the one or more of the plurality of requesters requests the second information object after the first information object.

17. A system for responding to a request for a selected information object comprising:

a first processor for processing the request;

means responsive to the request for identifying at least a second processor, the second processor allocating a space in an information repository for storing information objects from at least one source, the information repository being searched for the selected information object; and means for determining whether to store the information objects from the at least one source based on at least rates of transfers of information from the at least one source to realize the information objects.

18. The system of claim 17 wherein the first processor and the second processor each include a different proxy server.

19. The system of claim 17 wherein a portion of the information repository is arranged for use as a cache.

20. The system of claim 17 wherein the first processor includes a first interface, and the second processor includes a second interface, the first interface being connected to the second interface.

21. The system of claim 20 wherein the first interface includes a first agent processor, and the second interface includes a second agent processor, the first interface being connected to the second interface through a manager processor.

22. The system of claim 17 wherein each information object is identified by a URL.

23. The system of claim 17 wherein the plurality of sources include web sites on an Internet.

24. The system of claim 17 further comprising a plurality of intranets, wherein a first one of the intranets includes the first processor, and a second one of the intranets includes the second processor.

25. A method for providing information objects, the information objects being transferred from a plurality of sources, the method comprising the steps of:

identifying a subset of the information objects transferred from a selected source during a predetermined time period;

determining rates of transfers of information from the selected source to realize the respective information objects in the subset; and determining whether to store information objects from the selected source based on at least the rates of transfers.

26. The method of claim 25 wherein the sources comprise web sites on an Internet.

27. The method of claim 25 wherein the information objects are identified by URLs.

28. The method of claim 25 wherein a determination of whether to store information objects from the selected source is also based on the number of information objects in the subset.

29. A method for providing information objects, the information objects being transferred from a plurality of sources, the method comprising:

identifying at least a selected source from the plurality of sources, the processor identifying the selected source based on rates of transfers of information from the selected source to realize information objects from the selected source, the rates of transfers of information being lower than rates of transfers of information from at least one source different from the selected source; and storing selected information objects from the selected source.

30. The method of claim 29 further comprising identifying at least a second source from the plurality of sources, wherein the second source is identified based on number of information objects transferred from the second source, the number of information objects transferred being greater than number of information objects transferred from at least one source different from the second source; and storing the information objects transferred from the second source.

31. The method of claim 30 wherein the selected source is the same as the second source.

32. A method for providing information objects to a plurality of requesters requesting the information objects, the method comprising the steps of:

identifying a first information object last requested by a requestor of the plurality of requesters;

predicting a request for a second information object based on a history of one or more of the plurality of requesters requesting the second information object after the first information object, the one or more of the plurality of requesters being selected based on respective numbers of requests made thereby relative to respective numbers of requests made by requestors other than the one or more of the plurality of requesters over a predetermined time period; and prefetching the second information object in response to the predicted request.

33. The method of claim 32 wherein the information objects are identified by URLs.

34. The method of claim 33 wherein the history is represented by a URL graph.

35. The method of claim 32 wherein the plurality of requestors include web browsers.

36. The method of claim 32 wherein the history includes a count of incidents in which any one of the second selected requestors requests the second information object after the first information object.

37. A method for use in a system for responding to a request for a selected information object, the system including a first processor, a second processor and an information repository, the method comprising:

processing the request by the first processor;

identifying at least the second processor in response to the request;

allocating by the second processor a space in the information repository for storing information objects from at least one source;

determining whether to store the information objects from the at least one source based on at least rates of transfers of information from the at least one source to realize the information objects; and searching the information repository for the selected information object.

38. The method of claim 37 wherein each information object is identified by a URL.

39. The method of claim 37 wherein the plurality of sources include web sites on an Internet.

* * * * *